(No Model.) 2 Sheets—Sheet 1.
M. DEW.
CARRIER FOR HARVESTER PLATFORMS.
No. 390,010. Patented Sept. 25, 1888.
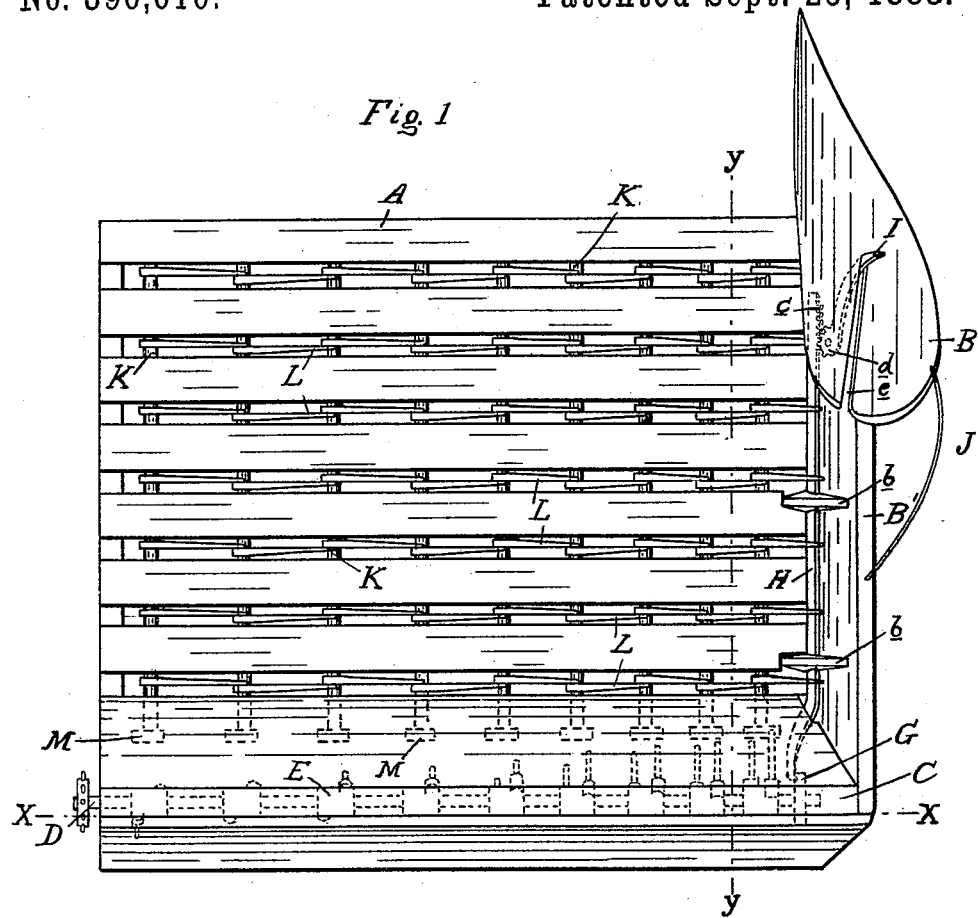
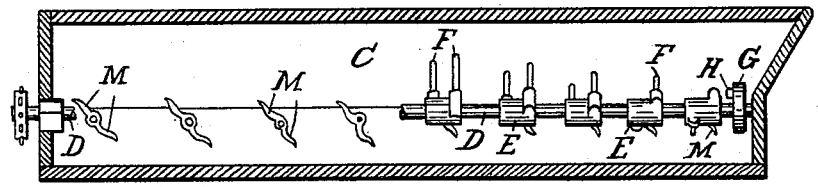
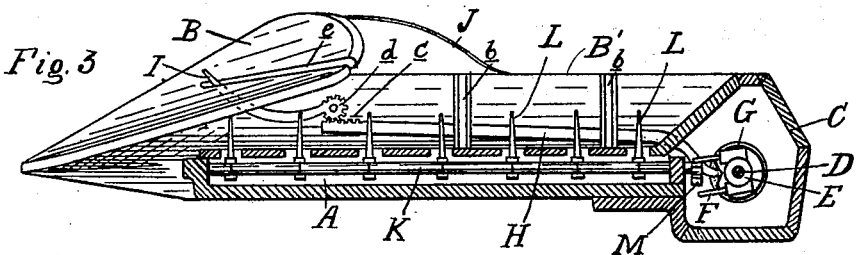
Witnesses:
P. M. Hulbert.
Jas. Whittemore
Inventor:
Martin Dew
By Thos. S. Sprague
Atty.

(No Model.) 2 Sheets—Sheet 2.

M. DEW.
CARRIER FOR HARVESTER PLATFORMS.

No. 390,010. Patented Sept. 25, 1888.

Witnesses:
P. M. Hulbert
Jas. Whittemore

Inventor:
Martin Dew
By Thos. S. Sprague
Atty.

UNITED STATES PATENT OFFICE.

MARTIN DEW, OF CASS CITY, MICHIGAN.

CARRIER FOR HARVESTER-PLATFORMS.

SPECIFICATION forming part of Letters Patent No. 390,010, dated September 25, 1888.

Application filed August 24, 1887. Serial No. 247,748. (No model.)

*To all whom it may concern:*

Be it known that I, MARTIN DEW, of Cass City, in the county of Tuscola and State of Michigan, have invented new and useful Improvements in Carrier Attachments to Harvester-Platforms; and I do hereby declare that the following is a full, clear, and exact description thereof, reference being had to the accompanying drawings, which form a part of this specification.

This invention relates to certain new and useful improvements in carriers for harvester-platforms.

The object of the invention is to provide a harvester-platform with a carrier and clearing-arm so constructed that they will automatically in the forward travel of the machine clear from the platform and divider-board the cut grain as it falls upon them and deliver it to a binding mechanism or other grain-receptacle at the side of the machine.

To this end the invention consists in the peculiar arrangement of rock-shafts transversely journaled in the platform, said rock-shafts carrying a series of curved carrier-arms and adapted to be partially rotated in succession in order that one set of arms may pick up and advance the grain delivered to them by the preceding set; also in the peculiar construction and application of a clearing-arm for the divider-board, and in the peculiar construction, arrangement, and combination of the parts, all as more fully hereinafter set forth.

Figure 4:
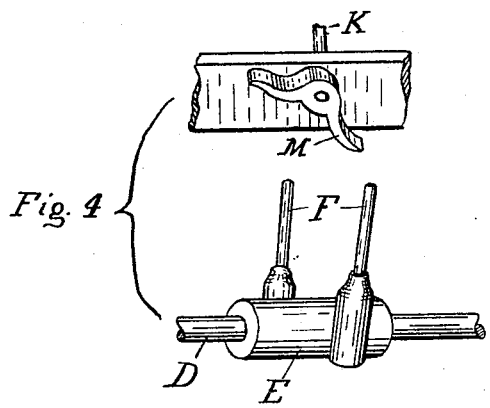
Figure 5:
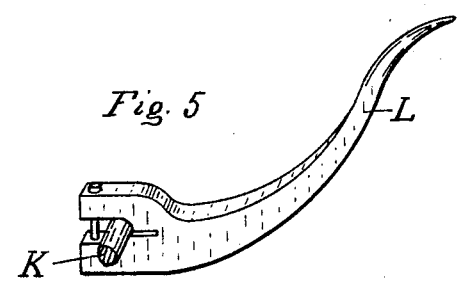
Figure 6:
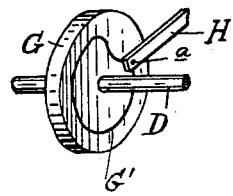
Figure 7:
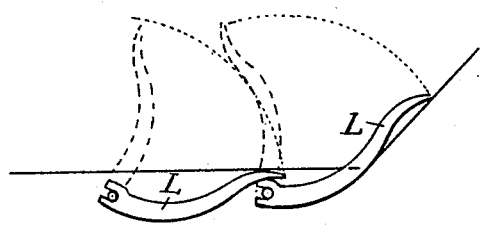

Figure 1 is a plan of a harvester-platform provided with my improved carrier. Fig. 2 is a vertical section on the line *x x*, Fig. 1. Fig. 3 is a similar view on the line *y y*, same figure. Fig. 4 is a detail perspective showing construction and arrangement of mechanism for operating the rock-shafts. Fig. 5 is a perspective view showing manner of securing the carrier-arms to the rock-shafts. Fig. 6 is a perspective view showing the cam-wheel for actuating the curved clearing-arm of the divider-board. Fig. 7 is a diagram showing relative positions of the carrier-arms as in the act of advancing the grain.

In the accompanying drawings, which form a part of this specification, A represents the platform of a harvester provided with the divider-board B, which has a rearward extension, B'. This platform consists of a solid or close bottom and a slatted top, as shown, there being sufficient space left between the two to receive the rock-shafts, hereinafter described.

At the rear side of the platform is constructed a suitable housing or boxing, C, in which is journaled, in proper bearings, the shaft D, designed to be driven by suitable connection from the driving mechanism of the harvester. This shaft has secured to it a series of heads, E, arranged spirally, as shown, and provided with tangential and parallel arms F. The two arms of each head are in different transverse and tangential planes. The outer end of this shaft D carries a wheel, G, provided with a cam-groove, G', in one face, (see Fig. 6,) with which engages the pin *a* of the sliding bar H, which has a reciprocating movement upon the extension B' of the divider-board in suitable brackets or guides secured thereto. This bar H passes through brackets *b*, and is provided at the end opposite the cam-wheel with a rack, *c*, upon its upper edge, which engages with the segmental rack *d* upon the lower end of the curved arm I, which is pivoted to the extension B', and has a movement through the slot *e* in the divider-board B, the latter being provided with the rearwardly-projecting curved guide-rod J.

K are a series of rock-shafts journaled across the platform beneath the slatted top, and these rock-shafts are each provided with a series of curved carrier-arms, L. The rear ends of the rock-shafts K project into the housing C, and have secured upon them the double cross-heads M, by means of which in the operation of the device the series of rock-shafts are successively partially rotated.

In practice, the parts being constructed and arranged substantially as described and suitable connection being made to drive the shaft D, the operation is as follows: As the harvester moves forward and cuts the grain, the latter falls upon the platform, and the shaft D being in motion the arms F are so timed that in the rotation of such shaft one of said arms strikes against one arm of the cross-head of the rock-shaft next to the divider-board. This causes the carrier-arms of that shaft to pass up through the slatted top of the platform and push the grain ahead of them, so that it may be taken up by the next succeeding series of carrier-arms of the next shaft, and so on until the grain has been delivered at the end of the platform to the binding mechanism. As each of the rock-shafts is caused to partially rotate when the terminus of the forward movement is reached, the carrier-arms should remain stationary in such position (before being returned to their horizontal position under the action of the arm F upon the shaft D, which compels such a movement) until the next series of carrier-arms shall have made so much of the forward movement as will be sufficient to carry forward and bring within the curve of the latter the grain which was advanced or delivered by the former.

The rotation of the shaft D imparts a similar motion to the cam-grooved wheel G, and the latter communicates a reciprocating motion to the bar H. This, by reason of the connections described, necessarily compels the curved arm I to rock on its pivot through the slot in the divider-board. This is for the purpose of clearing off any cut grain that may fall upon the divider-board or that might, in consequence of the grain being lodged or tangled, rest upon the divider-board, the guide-rod J directing such grain to the platform, where it is taken up and delivered by the carriers described to the other end of the platform.

What I claim as my invention is—

1. The combination, with a harvester-platform, slotted as described, of a series of rock-shafts journaled transversely of said platform and beneath the top of the same, carrier-arms on said shafts operating through the slots of the platform, and a cross-head on the end of each of said shafts, and a rotary shaft at right angles to the rock-shafts provided with arms arranged in different planes transversely of said shaft, whereby as the shaft rotates these arms strike first on one arm of the cross-head and then on the other to oscillate the rock-shafts, substantially as and for the purpose specified.

2. The combination, with a harvester-platform, slotted as described, of a series of rock-shafts journaled transversely of said platform and beneath the top of the same, carrier-arms L on said shafts operating through the slots of the platform, a cross-head on the end of each of said shafts, a rotary shaft at right angles to the rock-shafts, and pairs of tangential arms arranged in spiral form thereon and adapted to strike said cross-head first on one arm to raise the arms L above the platform and then on the other arm to lower said arms below the platform, substantially as and for the purpose specified.

3. The combination, with the platform and the divider-board, of the clearing-arm I, the rack $d$ thereon, the bar H, rack $c$ thereon, transverse shaft D, and connections, consisting of the cam-grooved wheel G and pin $a$, substantially as described, between said shaft and bar H, substantially as and for the purpose specified.

MARTIN DEW.

Witnesses:
JOHN ANYON,
DELL LEONARD.